United States Patent
Van Schie

[11] Patent Number: 5,679,265
[45] Date of Patent: Oct. 21, 1997

[54] METHOD AND DEVICE FOR THE SEPARATION OF A CONTAMINATED TOP LAYER

[75] Inventor: Louis Van Schie, Vlijmen, Netherlands

[73] Assignee: Lemacon Techniek B.V., Heteren, Netherlands

[21] Appl. No.: 387,852

[22] PCT Filed: Aug. 24, 1993

[86] PCT No.: PCT/EP93/02289

§ 371 Date: Jun. 19, 1995

§ 102(e) Date: Jun. 19, 1995

[87] PCT Pub. No.: WO94/04464

PCT Pub. Date: Mar. 3, 1994

[51] Int. Cl.⁶ ........................................ C02F 1/40
[52] U.S. Cl. ............ 210/776; 210/800; 210/122; 210/242.3; 210/521; 210/540; 210/923
[58] Field of Search ....................... 210/122, 123, 210/128, 242.3, 242.4, 521, 522, 538, 540, 776, 800, 804, 923

[56] References Cited

U.S. PATENT DOCUMENTS

| | | | |
|---|---|---|---|
| 2,284,737 | 6/1942 | Hirshstein | 210/540 |
| 2,831,579 | 4/1958 | Gehle | 210/540 |
| 3,708,070 | 1/1973 | Bell | 210/242.3 |
| 3,971,719 | 7/1976 | Peters | 210/540 |
| 4,064,034 | 12/1977 | Anderson et al. | 210/521 |
| 4,132,652 | 1/1979 | Anderson et al. | 210/521 |
| 4,213,865 | 7/1980 | Wagner | 210/522 |
| 4,253,965 | 3/1981 | Pielkenrood | 210/521 |
| 4,400,274 | 8/1983 | Protos | 210/521 |
| 4,422,931 | 12/1983 | Wolde-Michael | 210/540 |
| 4,980,070 | 12/1990 | Lieberman | 210/522 |
| 5,236,589 | 8/1993 | Torrance | 210/242.4 |
| 5,308,510 | 5/1994 | Gore | 210/242.3 |

FOREIGN PATENT DOCUMENTS

| | | |
|---|---|---|
| 2837554 | 7/1984 | Germany. |
| 3303632 | 8/1984 | Germany. |
| 3516895 | 11/1986 | Germany. |
| 3702482 | 8/1988 | Germany. |
| 3732136 | 4/1989 | Germany. |
| 3823664 | 2/1990 | Germany. |
| 443601 | 3/1936 | United Kingdom. |
| 2216821 | 10/1989 | United Kingdom. |
| 9014874 | 12/1990 | WIPO. |

*Primary Examiner*—Christopher Upton
*Attorney, Agent, or Firm*—Knobbe, Martens, Olson & Bear, LLP

[57] ABSTRACT

For the separation of a contaminated floating top layer of oil or oil substances, a continuous laminer flow is created on or near the surface, by placing a number of baffles (8, 8') in the path of the flowing liquid (V) as it moves through a tank (1). The total amount of liquid flowing through the tank (1) is now adjusted in such a way that the correct control of the upper laminar flow (5) and the dominant more turbulent lower flow near the bottom (9) of the tank (1) produces a controllable constant difference in height (delta h). This total difference in height (delta h) can also be attained by cascade operation.

33 Claims, 9 Drawing Sheets

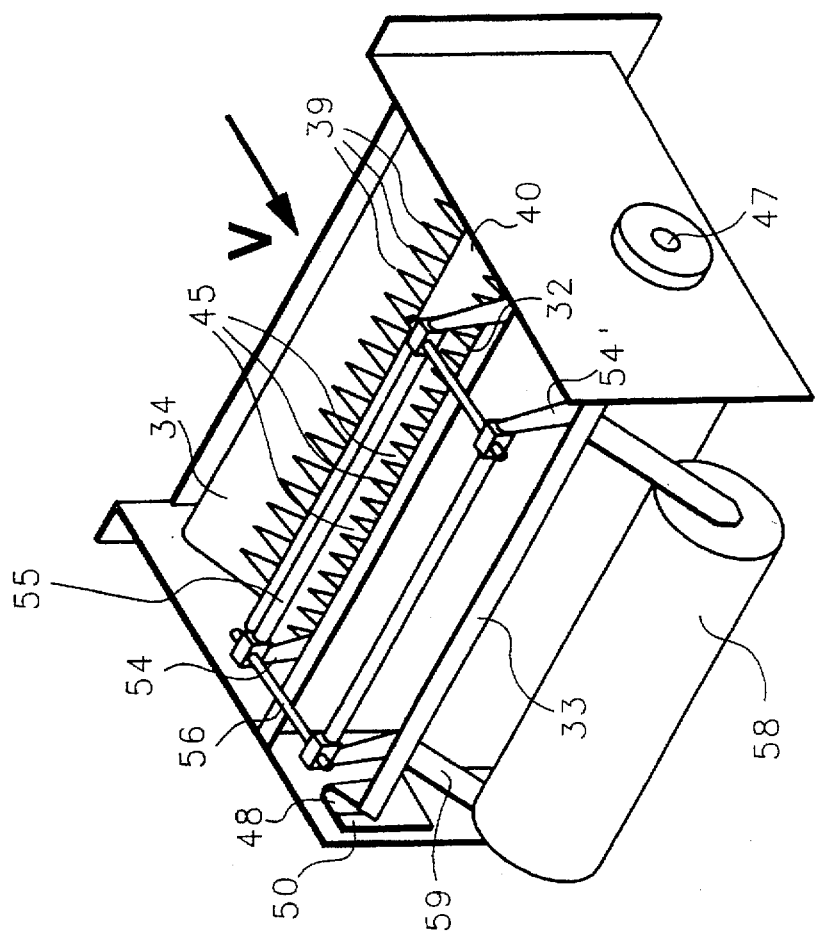
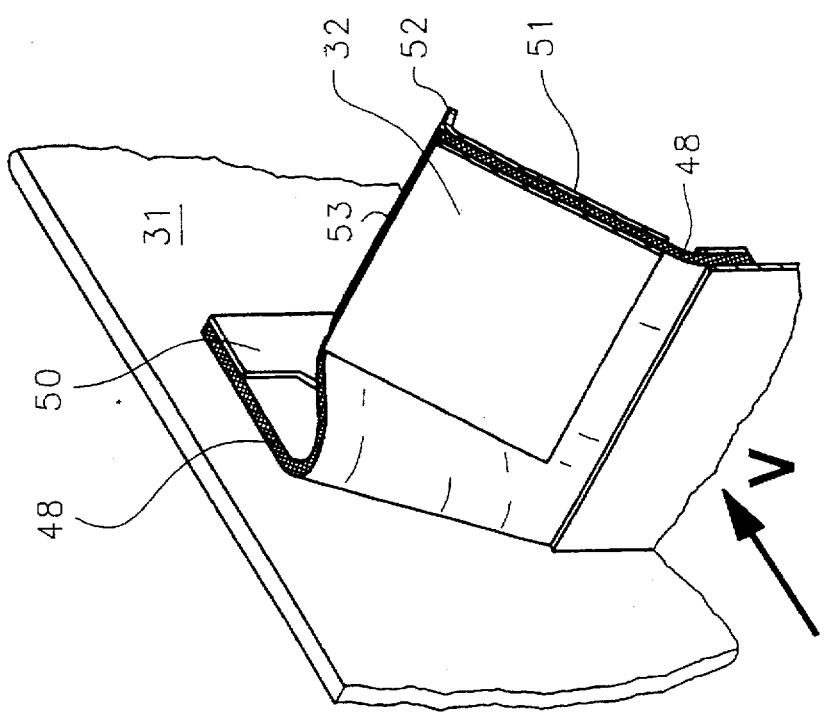

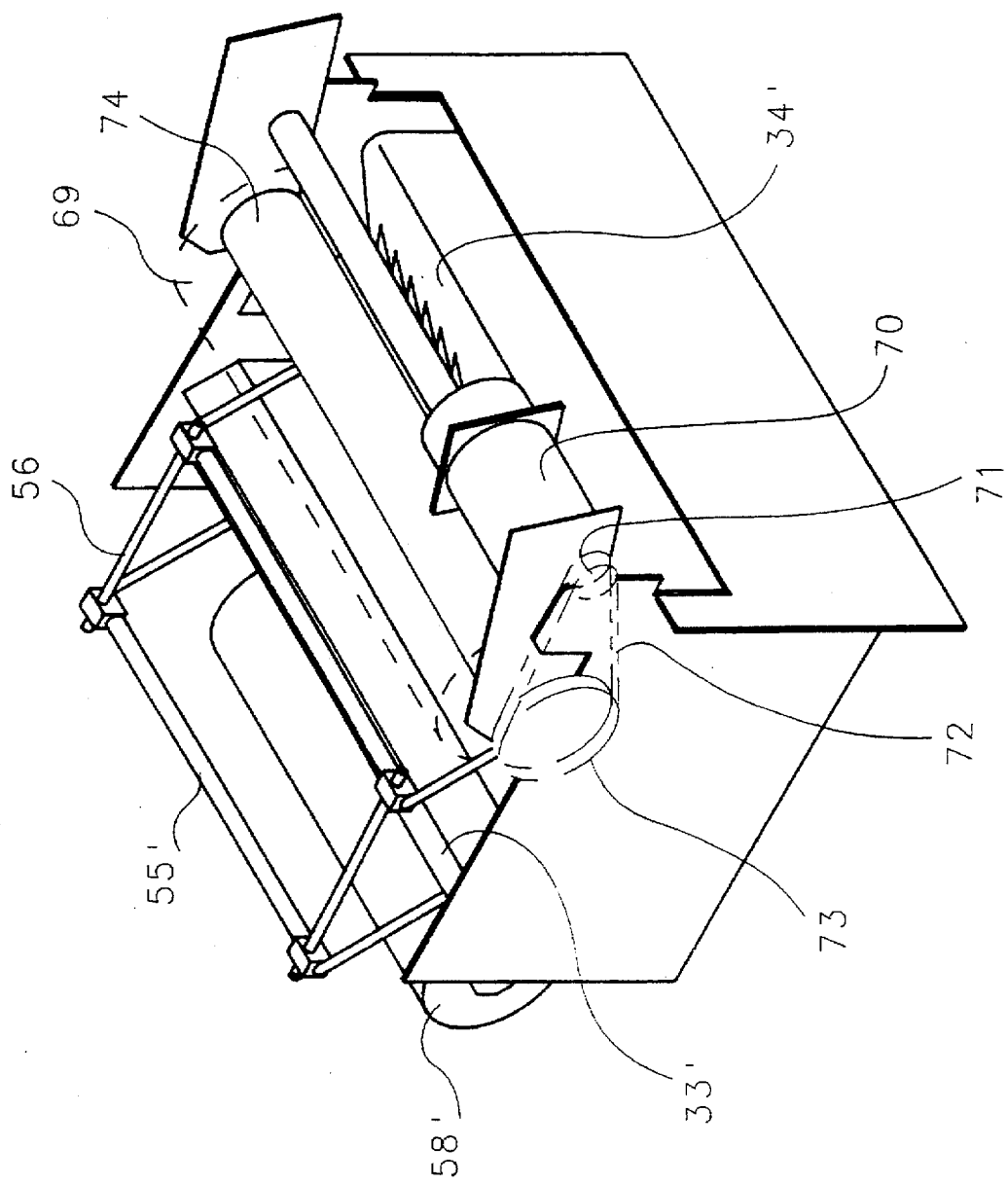

METHOD AND DEVICE FOR THE SEPARATION OF A CONTAMINATED TOP LAYER

The invention relates to a method for the continuous separation of a floating layer of light material (upper flow), such as oil or material particles saturated with oil and/or covered in oil, with respect to a heavier liquid supporting layer (lower flow), such as water, on which the floating layer is situated, by making use of a difference in level, to be maintained, between the inflow side located at a higher level in a device for the separation, and the discharge side, located at a lower level on the said device, for the removal of the largely separated supporting material (lower flow), and by making use of an overflow unit for the material to be separated (upper flow) into the collection chamber for this, whereby the top side of this overflow unit extends no further below the common level of the liquids fed in than the minimum or more or less stable continuous thickness of the floating layer (upper flow), which can be removed from the collection chamber using means that are known per se. The invention also relates to a device for the application of the aforementioned method.

In connection with the increasing stringency of requirements set by national governments with regard to the discharging of waste substances into surface waters, various methods and devices had already been proposed, all with the purpose of purifying the waste water before it is discharged into surface waters. If intolerable pollution of surface waters would occur, e.g., shipping disasters or the like, the requirement is also set that the pollutor must immediately perform effective cleaning measures.

The method has the purpose of bringing about faster treatment and, with regard to the attainment of the optimum separation of the material flows (upper and lower flows) in the flow range of both of the material flows that are fed in from the said inflow side to the overflow unit, for example floating oil and water, it ensures that a mainly laminar flow pattern is maintained in one and the same direction of passage above and below the separation layer (of the upper and lower flow) of the liquids, while, up to a considerable distance below the overflow unit, by means of a baffle placed perpendicular to the main flow, the flow pattern in the vertical direction (lower flow) is deflected upwards and downwards, parallel to the baffle, at a relatively low flow speed, whereby, in downward direction, a small to considerable part of the main flow of the supporting material (lower flow) is able to flow away to the aforementioned discharge side with a reduced liquid level, through at least one relatively narrow passage opening, for example, in the form of a round or oval opening, or, for example, a passage gap and, furthermore, an increasing thickness of the floating layer is maintained behind the overflow unit, with a simultaneous choice between controlling the liquid flowing through the device, and/or the amount of the floating layer removed from the collection chamber per unit of time and/or the height of the overflow unit, and/or the size of the passage opening, e.g. of a gap, in order to attain the optimum stable flow pattern.

The active level difference employed by the invention may possibly be spread over a number of liquid-level steps, to which end a cascade-overflow system could be employed. According to the invention, this occurs because the liquid flows are carried along two or more baffles with each of the associated overflow units at different heights, all arranged in such a manner that the differences in liquid levels in front of and behind each baffle are each controlled to a stable flow pattern which gives rise to this cascade-overflow system.

When this method is applied on board of a ship and, e.g. a (crude) oil slick has to be tackled, it may first be necessary to ensure that the oil slick does not sink to the sea bottom during bad weather or, e.g., that undesired emulsification does not occur. In those cases it may first be effective to bind the oil (or tar) to a number of supporting particles, e.g., plastic-foam particles. In that case, according to the invention, the upper floating layer consists of light plastic-foam balls or a similar material with a relatively large surface area which is adhered to and/or penetrated by the material to be separated.

According to the invention, a device for separating one floating lighter material component from a second heavier material component, by making use of the method, consists of a passage reservoir through which flowing liquid passes, which flowing liquid has an upper flow, in which the lighter material components (oil or particles with oil attached to them) are found, floating on the lower flow, and which passage reservoir consists of a channel-shaped tank that, e.g., is open or closed on the top side and is provided with a front wall perpendicular to the direction of flow, which is provided with an inlet, as well as a rear wall, likewise perpendicular to the direction of the flow, for removal or transfer of the lower flow and, furthermore, between the from and rear wall, one or more baffles are mounted, whereby each baffle that reaches the bottom of the tank is provided with at least one passage opening, e.g., comprising a number of round passage openings or, e.g., at least one passage gap extending across the tank, and also forms an overflow unit for the layer to be separated, one and the other in such a way that the liquid level of the lower flow in the reservoir compartment upstream, of a baffle, differs considerably from the liquid level of the lower flow in the reservoir compartment downstream, of a baffle. Basically, this set-up is intended to maintain a laminar flow pattern within the range of the top layers of the upper and lower flow, and to guarantee a turbulent flow pattern within the range of the bottom layer of the lower flow, which produces a remarkably effective result, as has been seen in practice.

For a stationary device, it will be possible to obtain favourably a stable flow pattern for a given flow; on the other hand, a mobile device for use in open water with, e.g., beating waves, would produce more problems, in which case it would be advisable to fit the device according to the invention with adjustable first means, in order to, if necessary, repeatedly control the height of an overflow unit for the upper flow to be separated, in combination with adjustable second means for the control of the size of the aperture of the passage opening and/or passage gap close to the bottom of the tank.

In an especially favourable embodiment, the device according to the invention is equipped in such a way that a perforated plate, of which the diameter of perforation e.g. increases in size in the down-stream flow direction, is mounted more or less horizontally in each upstream compartment of the tank to promote the maintenance of a laminar flow pattern immediately within the range of the separation layer between the upper and lower flow.

In each case, according to the invention, it is possible to provide specially formed compartments, if a number of them are formed by an enlarged honeycomb-like structure provided with means for adjusting the distance with respect to the bottom of the tank as well as of the height of the upper wall sections of the said honeycomb-like structure, which function simultaneously as overflow units. In addition, the top side could for instance slope downwards, together with the total course of the liquid level difference that has to be maintained between the inflow side and the transfer side of the tank.

Furthermore, according to the invention, it may be useful to promote the separation of the top material layer at the point of a baffle. Amongst other ways, this can be achieved by a baffle near the overflow unit provided with a curved upward-sloping edge sloping downwards in downstream direction at its back, to subsequently change into a vertical section again slightly bent to slope upwards in the downstream direction near the bottom of the tank, in order to obtain a venturi effect. In another preferable embodiment, a baffle is provided with a curved rising edge near the overflow unit which edge extends downwards as a vertical section, after which a section is bent through a sharp angle in the direction of the flow and is preferably provided with at least one passage opening, e.g., comprising a number of round passage openings and/or at least one passage gap.

Numerous tests with the device have shown that the controllability of its operation can be considerably improved if, taking into consideration the composition of the material flows to be separated, a number of further technical measures are taken. The fluctuations in the flow of the composite material flows being fed in can be controlled, and with it the device's efficiency, if the flow of the discharge of the separated lighter material flow is determined by positioning a movable first valve unit and the flow of the discharge of the cleaned material flow is determined by positioning a movable second valve unit.

The positions of both valve units can now be simply controlled so that each movable valve unit is connected to a fixed transverse section of the tank, for example a baffle or rear wall, by means of a hinged joint. This is preferably formed by an oblong, flexible strip of material, especially one made of an elastomer (rubber), which is attached in such a way that it seals along one of its long sides to the fixed transverse section of the tank, while the other long side is attached so that it seals to a rigid strip-shaped valve unit.

It has become apparent that it is advantageous if the movable seal along the height of the valve unit, between the side wall and the transverse section of the tank, is formed by the hinged strip of the elastomer material that runs sideways over the total length of the valve unit to the side wall of the tank. In order to also promote the mobility of a valve unit with respect to the wall of the tank, while maintaining the intended sealing effect, it is desirable to interfit a strip of sealing elastomer material at the position of the side wall between the movable ends of a valve unit and that fixed side wall, along the height of the valve unit, the rigidity of which only extends to a certain distance away from that side wall. In an especially favourable embodiment of construction, the hinged seal of the valve unit is formed by one material strip of the elastomer material of which the height corresponds to that of the valve unit and of which the length corresponds with at least the length of the total length of the valve unit, plus the valve's clearance or free distance of travel from the top of the valve unit with respect to the hinged joint.

Depending on the required setting for both of the valve units, means can be provided to adjust the position of the valve units separately with respect to each other. Another favourable embodiment arises if, once both valve units have been set in their common positions, they can be operated by means of one common coupling unit that is adjustable.

In addition, it is an advantage if the adjustment of the coupling unit is attained by means of a float, whereas after the tank the cleaned second material component flows into an extra container, the level of which is then affected by the float and the position of a valve unit connected to it.

When using the device according to the invention for material flows that contain material particles that can cause blockages in the narrow passage openings, the removal of the particles is facilitated by providing a baffle with a number of passage openings situated next to one another near the bottom passage gap, whereby each opening is formed out of the baffle's sheet material, namely by making a vertical cut and then bending the sheet outwards on both sides of the cut, along fold lines, over a certain distance, in the direction of flow, in order to create a triangular self-cleaning passage opening.

An excessively low temperature in the immediate vicinity of the overflow area of a baffle and/or a valve unit can also cause a blockage, as a result of the coagulation of the floating material components, amongst other things. This kind of blockage can be removed if, e.g., the device according to the invention is provided with a heating element, in which case a sheet-form section of the tank or of a valve unit is constructed with a double-wall and a heating element is fitted inside that double wall, such as a steam-heated element or an electric element.

Other blockages may occur in the tank and in front of or close to the valve units or overflow baffles. In order to, avoid these blockages or accumulations of the floating material component, as much as possible means are provided that consist of a slowly rotating scraper unit, particularly a sweeping brush, which has the purpose of removing any undesired accumulation of larger particles in front of the valve unit, in the event of a floating layer in a compartment of the tank not having a uniform composition (e.g. different particle sizes), by stopping the accumulation of particles near the top side of a valve unit, which means are furthermore set up in such a way that the particles are not swept past or over the greatest height of the said valve unit.

Some embodiments of the invention are explained below in more detail below by means of the drawing.

FIG. 10 shows a detail of the side connection or seal between a valve unit and the side wall of the tank in a device according to the invention;

In various figures, the same reference numbers indicate identical components in different embodiments.

Figure 1:
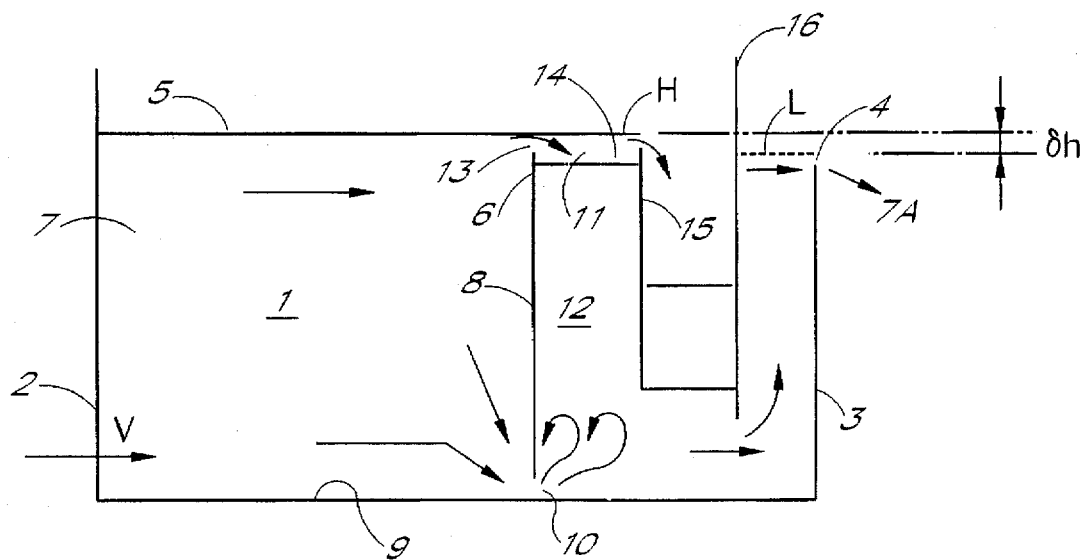
FIG. 1 is a schematic diagram of a longitudinal section of an extremely simple construction of a separator according to the invention.

FIG. 1 is a cross-section of a canal-shaped tank which is open at the top, with external dimensions that can range from half a meter to several meters, e.g. when used for ships. The main flow direction V is indicated on the inflow side 2 of the tank 1. There is a transfer wall 4 on the discharge side 3 of the tank 1. The upper flow 5 (water and oil or grease) and the separate lower flow 7, (water) flow from left to right in the tank 1. Depending on the number of parameter values, e.g. the flow volume, nature and size of the product to be separated, the height, width and length of the tank 1 for separation of specific material flows, a baffle 8 is placed between the inflow side 2 and the discharge side 3. In this embodiment, the height of the baffle 8 is slightly below H, while on the bottom side 9 of the tank 1, over its full width, a passage opening in the form of a passage gap 10 is left open. While it is desirable to maintain a laminar flow pattern in the upper part of the tank 1 for effective separation of the various material flows (oil or grease and water), a turbulent flow will exist in the lower part of the tank 1 at the passage gap 10, also having the purpose of promoting the stability of a thicker floating layer 11 in the collection chamber 12 behind the baffle 8.

Furthermore, the arrows in the figure are used to provide an extremely systematic indication of the subsequent path of the upper flow 5 or the lower flow 7. The height of the transfer wall 4 is lower than the height of the baffle 8, in such a way that there is a constant difference in height $\delta h$ between the highest point H of the upper flow 5 and the highest point L of the discharge flow 7A which consists of lower flow 7 and water from upper flow 5, so that this constantly maintained difference causes the (contaminated) upper flow 5 to be pushed over the overflow 13 of the baffle 8 into the collection chamber 12, where oil and/or grease will be accumulated to form a thicker layer 14, while water can flow away downwardly. FIG. 1 further shows a standpipe 15 that opens in the collection chamber 12 at such a level under H and above the separation layer 6 that the thicker layer 14 can be removed via the standpipe 15. The standpipe 15 can be closed at its bottom and then be emptied, e.g., by means of a suction connection to the suction side of a pump, or it can run into a collection chamber (for oil) underneath the tank 1 from where it can be pumped. The invention, however, does not relate to the removal of the upper flow 5, so that relevant constructional details are not further considered. In FIG. 1 the standpipe 15 is mounted to a supporting baffle 16 and the turbulent lower flow in the collection chamber and behind the supporting baffle 16 ensures that the difference in level $\delta h$ is maintained on the one side and, on the other side, partly because of this, that the thickness of the upper layer 5 behind the transverse baffle 8 increases on account of the laminar accumulation.

The passage gap 10 in FIG. 1 can sometimes cause blockages, depending on the further contamination of the liquid materials being treated and it has become apparent that, as an alternative, this passage gap 10 can be completely shut off, provided another sort of passage opening is provided near the bottom of the tank 1, for instance by means of a horizontal row of round or oval holes or perforations or a combination of these, with a number of passage gaps that do not extend across the full width of the tank. These may possibly be provided horizontally and/or vertically in a baffle. It has become apparent that this separation tank 1 operates extremely effective with various flow volumes in separating oil-containing waste water, in which case a difference in level of 10 mm was used.

Figure 2:
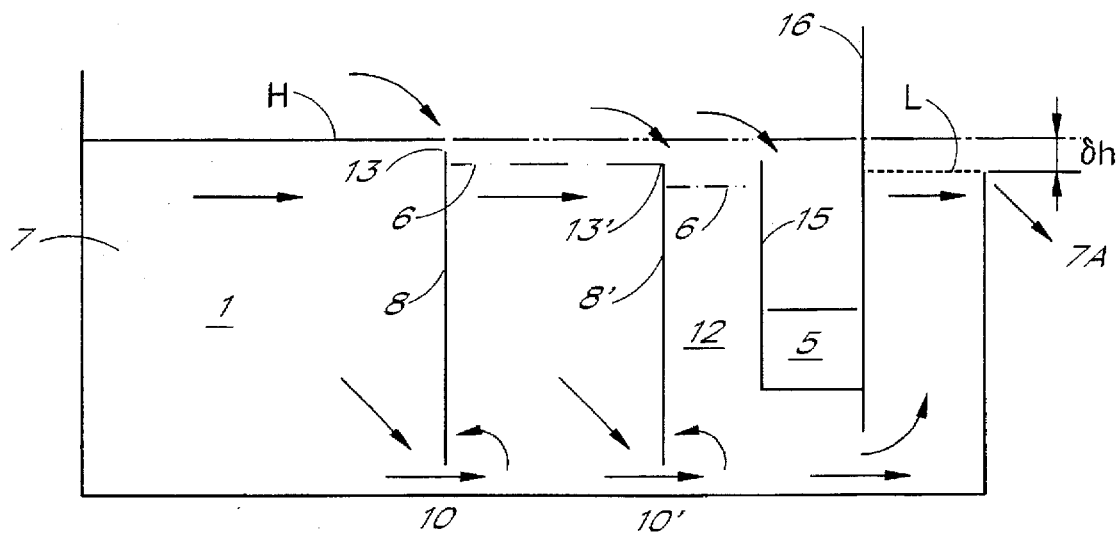
FIG. 2 is a schematic diagram, likewise of a longitudinal section, of a cascade type of construction for a separator according to FIG. 1.

In FIG. 2, showing a larger tank, a second baffle 8' is shown and the difference in level $\delta h$ can be divided over a cascade or made even larger. Like the embodiment shown in FIG. 1, use can be made of means (not shown here) for controlling the height of the overflow units (13 and 13'), and means for controlling the whole or part of the size of the passage openings 10 and 10', whereby, in combination with other tank parameters, it becomes possible to obtain or maintain any required laminar or turbulent flow pattern, which will, of course, be highly dependent on the composition of the material to be "purified". In the event of the tank 1 being installed on board of a ship, the speed of the flow will be linked to the vessel's speed and, consequently, more and different parameters will play a role that will affect the adjustment for the creation of a laminar or turbulent flow pattern through the tank 1.

Figure 3:
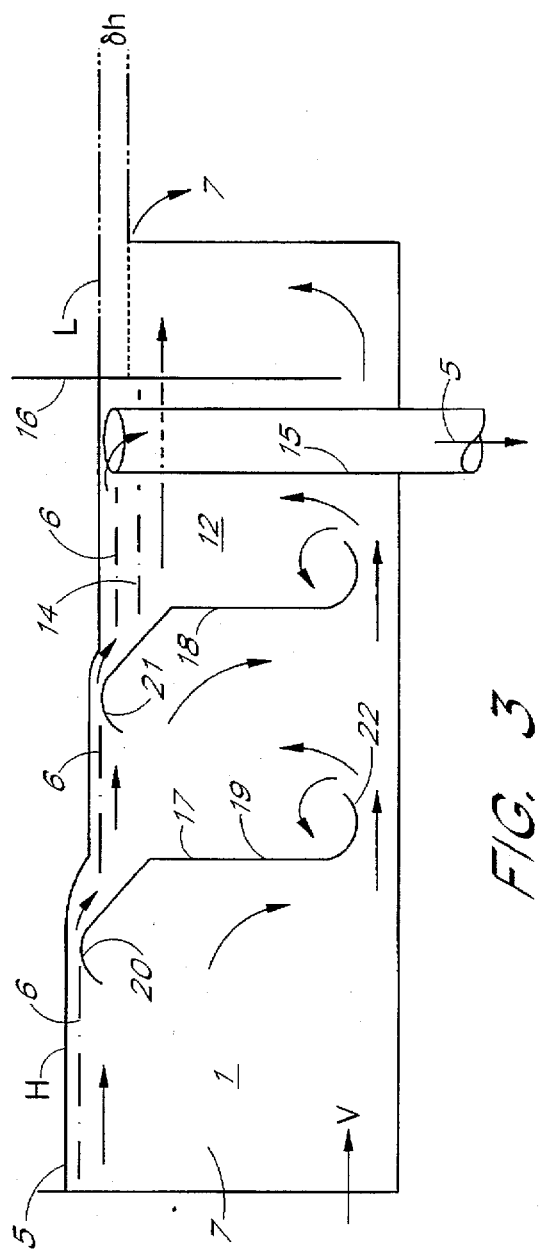
FIG. 3 is a schematic diagram of a longitudinal section of an industrial oil separator according to the invention.

FIG. 3 shows a separator of which a tank 1 is provided with differently shaped baffles 17 and 18. A baffle has a largely vertical section 19 that is curved at one part 20 to the left near the top side over an obtuse angle against the direction of the flow V. The end that the liquid flows against 21 is rounded off, which promotes the accumulation of the upper flow 5 that is being separated. In a downward direction the vertical section 19 changes into a curved end section 22 that promotes a venturi effect and consequently the creation of a turbulent flow pattern.

Figure 4:
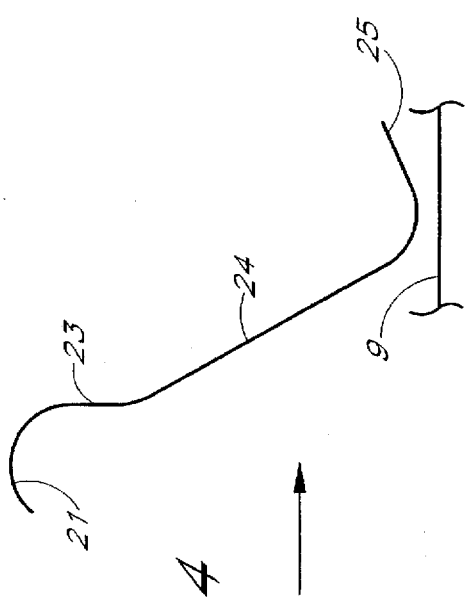
FIG. 4 is a crosssectional view of a baffle having an altered construction.

FIG. 4 shows another embodiment of a baffle. The end 21 that the liquid flows against can be the same as that of the baffle shown in FIG. 3, however, it extends downwards as a vertical section 23, after which a section 24 is bent through a sharp angle in the direction of the flow and continues on to the lower end 25 which is again intended to create a venturi effect.

Figure 5:
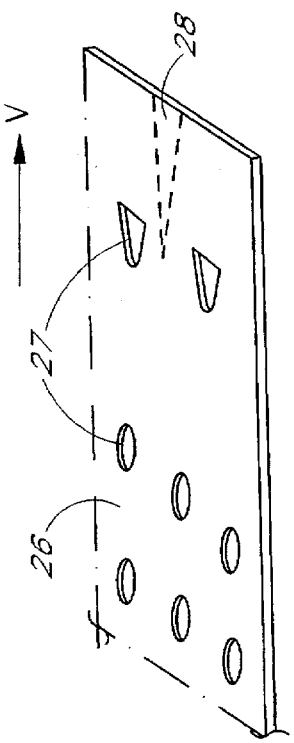
FIG. 5 is a schematic diagram of a perforated horizontally positioned baffle.

FIG. 5 shows a perforated baffle in perspective which is intended to be highly effective to maintain the laminar flow pattern near the separation layer 6. As indicated, the pattern of the perforations 27 can consist of regular shapes, e.g., round or oval holes, teeth, rectangular slot perforations or, as in the drawing, triangular perforations, with the apex pointing against the direction of the flow V. The dotted line in FIG. 5 shows the toothed construction 28. It has also become apparent that the latter perforations, which in shape diverge in size in the direction of the flow, can make a considerable contribution to the maintenance of the desired laminar flow pattern.

On the basis of the possibilities indicated, an expert in fluid mechanics will certainly see that no technical restriction exists with regard to the application, the positioning, the number of perforations to be made and the form of the flow profiles for the upper flow, or with regard to the perforated baffle, which together with the various forms of transverse baffles contribute to the further realization of the invention.

Figure 6:
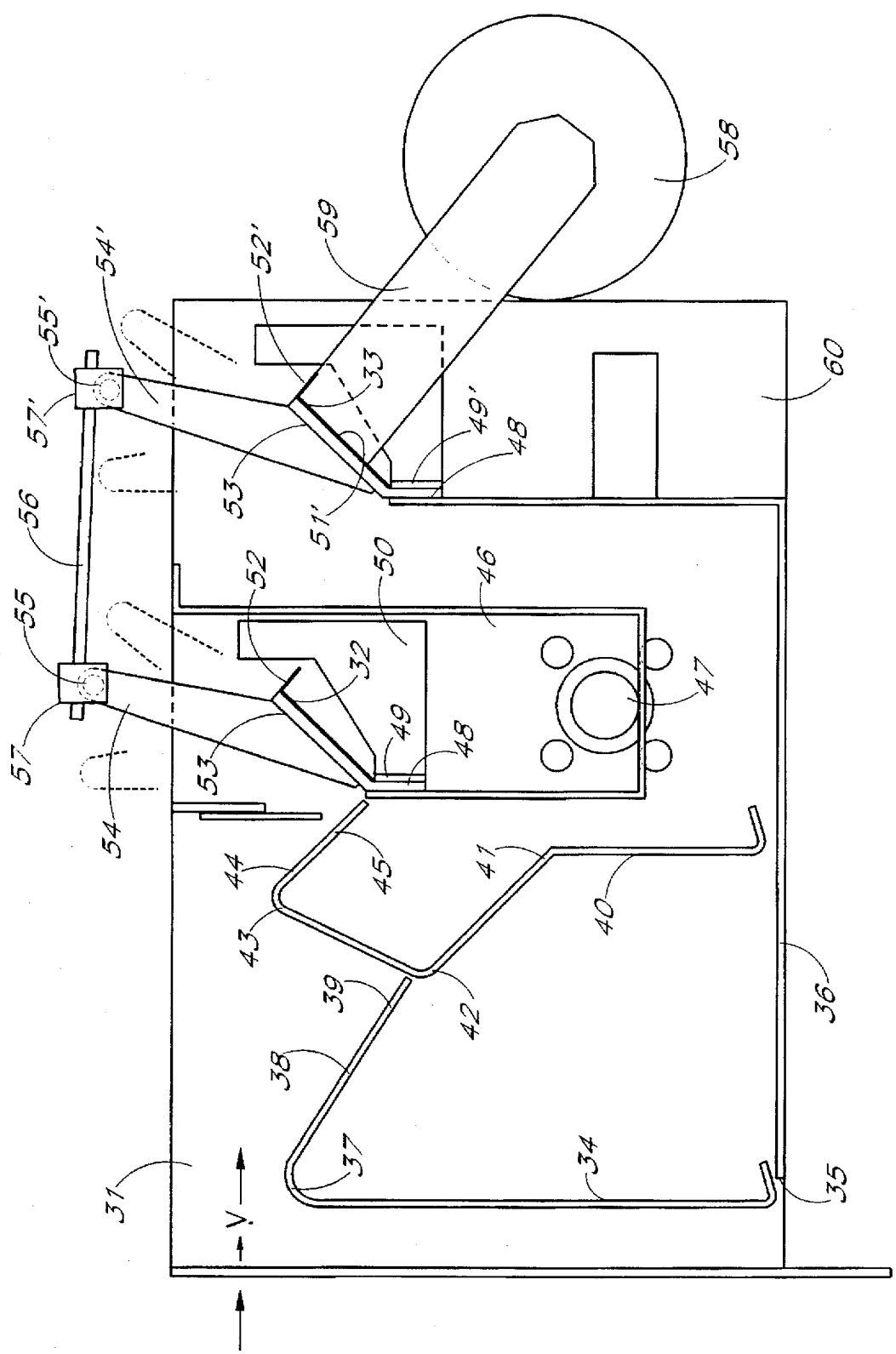
FIG. 6 shows a large-scale cross-sectional view (midsection lengthwise) of a device according to the invention which is shown in FIG. 7 in perspective on a reduced scale.

In FIGS. 6 and 7, the material to be continuously separated, hereinafter referred to as oil or water respectively, is fed into the tank 31 as a common flow volume of oil with water that follows the main flow V, and the levels in the subsequent compartments of the tank 31 are in fact adjusted by the position of the valve unit 32 for the oil discharge, or the valve unit 33 for the water discharge. The first baffle 34 consists of a vertical sheet section, the lower end of which forms a passage gap 35 with the bottom 36 of the tank, and the upper end has a curve 37 and a sheet section 38 that slopes away in the direction of the flow. This sheet section 38 has V-shaped notches 39 that promote a laminar flow. The second transverse baffle 40 has a first bend 41 against the direction of the main flow V followed by a second bend 42 in the direction of the main flow V, and then a curve 43 which is followed by a steeper sloping sheet section 44. This sloping sheet section 44 also has V-shaped notches 45 which are likewise intended to promote a laminar flow pattern. The fixed baffles 34 and 40 in the tank 31 are seal-jointed to the side wall and the height of the curves 37 and 43 can be more or less equal. In FIG. 6, the oil-collection chamber 46 is connected to an oil-discharge connection 47 and, on the inflow side of the collection chamber 46, there is a first hinged valve unit 32. The hinge consists of a strip 48 of elastomer rubber material that extends over the entire width of the tank and is clamped to the edge of the collection chamber 46 by means of a narrow metal strip 49. This metal strip 49 is fitted on both sides with a sheet section 50 bent through 90°, which is fixed to the inside wall of the tank 31. The clamping or the fastening can be achieved using fastening elements, e.g., blind rivets, nuts and bolts, or the like, which are not further described here. The valve unit 32, consisting of a rigid metal strip 51 with a folded edge 52, the clamped rubber strip 48 and a second metal strip 53, can be operated using two hinging lever arms 54 joined together by means of a connecting rod 55. Valve unit 33 is operated in a similar manner and has the same construction as described before for valve unit 32. The same parts are shown in the drawing with the same reference numbers provided with an apostrophe. Depending on the positions of the valves 32 and 33, as set beforehand by the operator, the lever arms 54 and 54' can then be joined by a pair of common adjusting rods 56 and 56 which are provided through passage apertures 57 and 57' on the top end of each of the lever arms 54 respectively 54'. Close to these passage apertures, the adjusting rods are threaded so nuts (not shown here) can be used to fix the position of each lever arm 54 respectively 54'. On the discharge side of the purified water, a float unit 58 is rigidly attached to valve unit 33 by means of a holder 59 and thereby controls the position, depending on the level in the extra compartment 60 fitted after the tank 31, which is only shown schematically.

With a continuous inflow of the material components to be separated, the required height differences between the oil layer and the water level have to be set by first adjusting the valve units 32 and 33, after which the common connection between the lever arms 54 and 54' can be fixed by means of the adjusting rods 56 and 56', so that the operating mechanism is operated continuously via the float 58.

In FIG. 10 a detail is shown of the side wall 61 of the tank 31, showing the seal-jointing to the ends of valve unit 32. The same applies to the seal-jointing of valve unit 33. The strip 48 of elastomer material extends sideways so far beyond the rigid strip 51 of valve unit 32 that the remainder allows sufficient distance of travel for valve unit 32 to be flee to move in an upstream and downstream direction. The end of strip 48 is then fastened by means of a clamping strip 50 to the side wall, using, e.g. nuts and bolts (not shown on the drawing).

Figure 8:
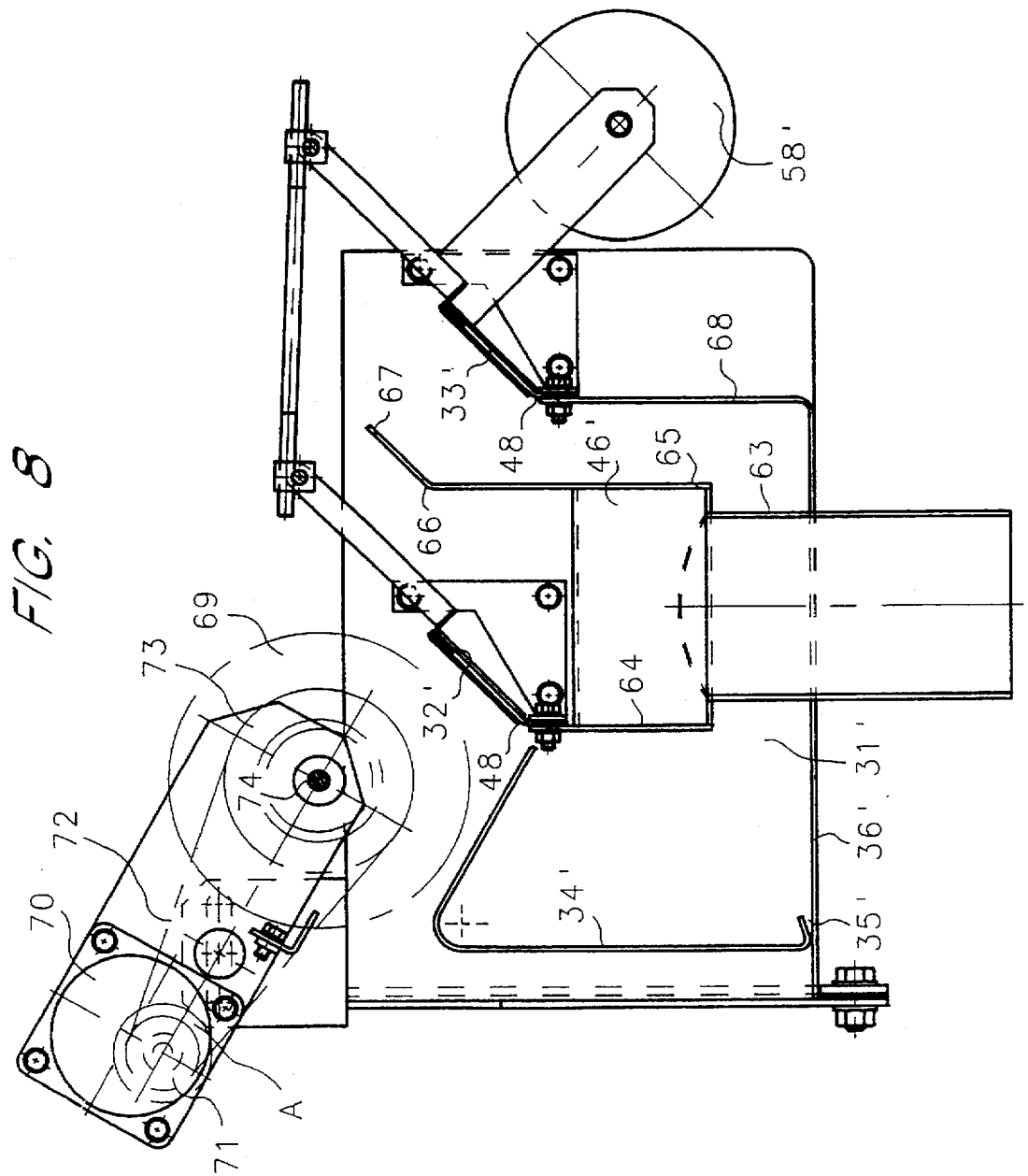
FIG. 8 shows a large-scale cross-sectional view (midsection lengthwise) of another device according to the invention with a sweeper device which is shown in FIG. 9 in a reduced perspective scale (like in FIG. 9A–9D relating to it)
Figure 9A:
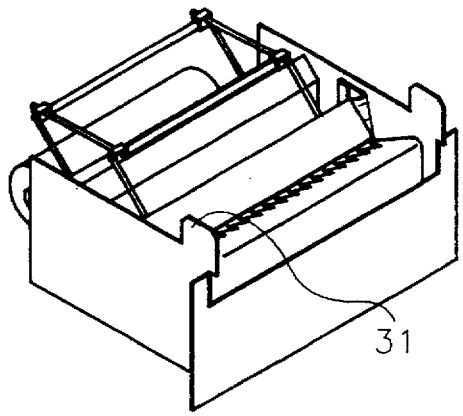
Figure 9B:
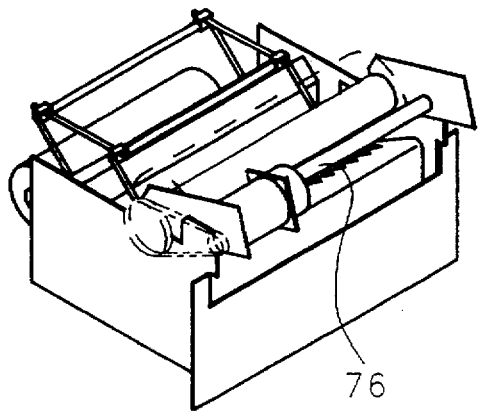
Figure 9C:
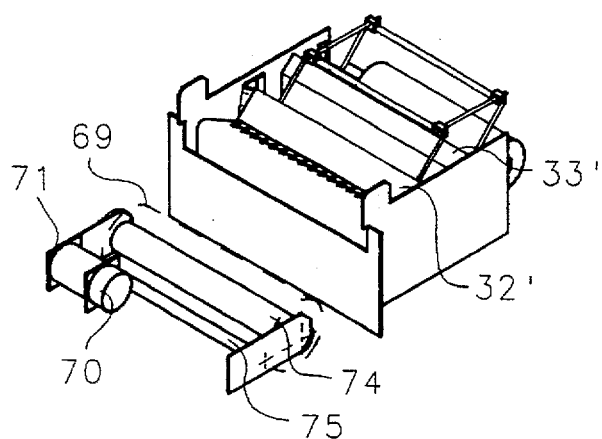
Figure 9D:
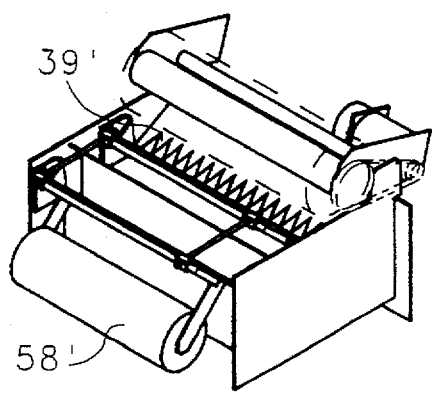

FIGS. 8 and 9 show another embodiment for a tank 31' in which a baffle 34' is fitted that forms a passage opening 35' with the bottom 34' of the tank 31'. The collection chamber 46', the bottom of which inclines towards the middle, is further provided with a pipe connection 63 for discharge of the separated material component. Moreover, the front wall 64 of the collection chamber 46' is fitted with a valve unit 32' and the open rear side 65 has a bend 66, after which the end 67 of the sheet wall is bent through an angle in the direction of the main flow V and serves to transfer the heavier material component, water. The movable valve unit 33' is fitted to the baffle 68 and the attachment of the flexible hinged joint, formed by the strip 48, is the same as used in the embodiment shown in FIGS. 6, 7 and 10. The common adjustability of the position of both valve units 32' and 33' and their common connection, as well as the operation with the float unit 58', is likewise as in the embodiment described in FIGS. 6 and 7. The special form of embodiment of FIGS. 8 and 9 consists of a sweeper unit A fitted to the tank 31', which consists of a sweeper roller 69 and a motor 70, as well as a pinion 71 driving a gear wheel 73 via a chain 72 on the shaft 74 to which the sweeper roller 69 fitted.

If a flow of floating material containing particles of irregular sizes is provided, the particles concerned could result in blocking the continuous throughput over the folded edge of the sheet or the valve unit 32', however this is avoided by the use of the slowly rotating sweeper roller 69 which keeps the particles moving. The sweeper unit A is shown in more detail in the FIG. 9A–9D. The frame of the sweeper unit consists of side plates 75, which are attached to a cross bar 76, in which the shaft of the sweeper roller 69 is fitted, as well as the shaft of the motor 70. Holes for bolts are provided in the side plates. On both sides of the side wall of the tank 31 there are bolt slots 77 which enable the sweeper unit A to be set up as required with respect to the baffle 34' by means of bolts 78.

Figure 11:
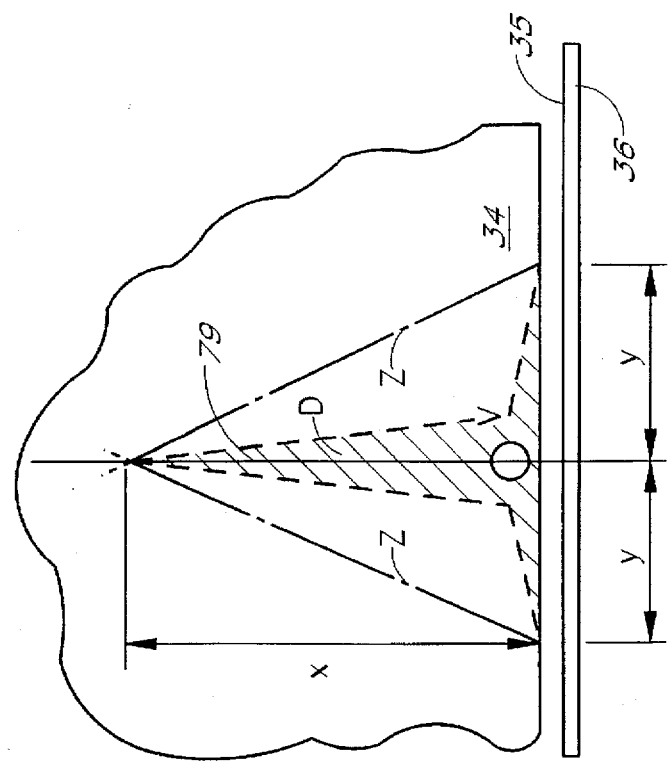
FIG. 11 shows the bottom side of a baffle in which self-cleaning passage holes are provided.

FIG. 11 is a schematic diagram showing a self-cleaning passage opening D. A number of passage openings D is made in the baffle 34 which may possibly be combined with a passage gap 35. Each passage opening is formed out of the baffle's sheet material by making a cut 79 along a vertical line X and then bending the sheet outwards on both sides of the cut, along the fold lines Z, over the distance Y, in the direction of flow, in order to create a triangular self-cleaning passage opening. In the absence of a passage gap 35, this forms an opening split that converges from the centre to the sides near the bottom 36, while in the upward direction a passage opening is produced in the form of an isosceles triangle, indicated by D. The boundary of the total passage opening D lies behind the plane of the drawing. Together, the four parameters formed by the number of passage openings, the distances X and Y and the angle of bending along the lines Z, can produce a series of specific baffles for repeatedly purifying a series of particular contaminants with, e.g., various particle sizes.

Figure 12:
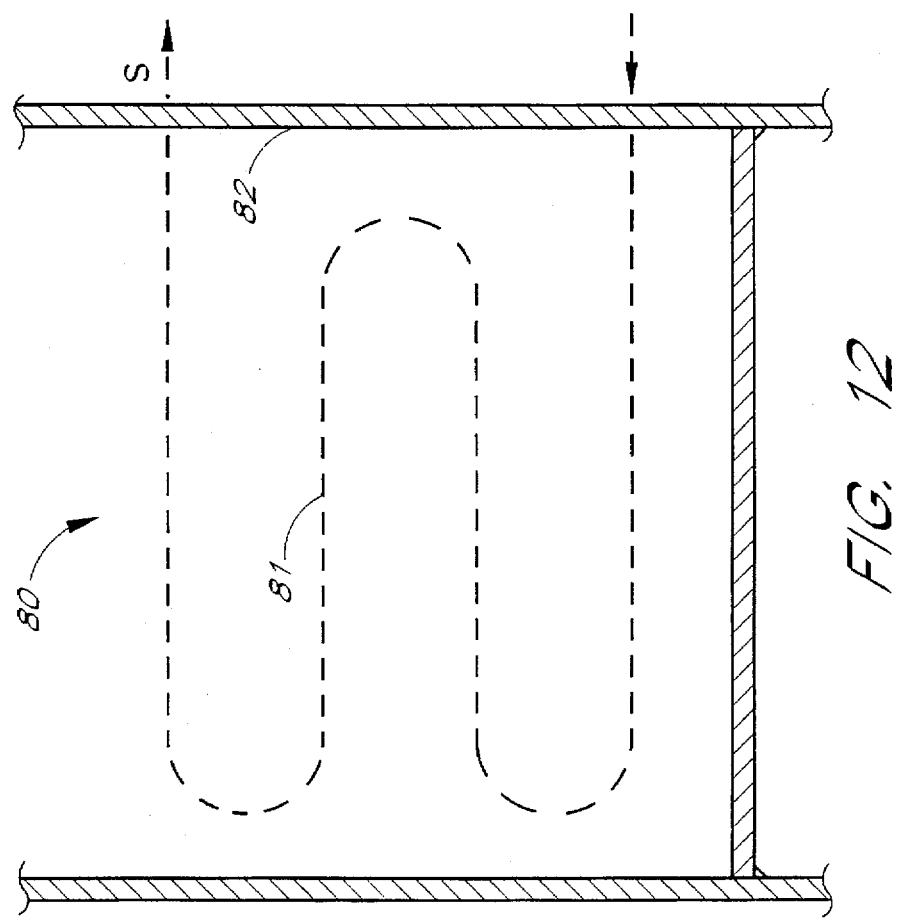
FIG. 12 is a schematic diagram of a single-walled baffle on which a heating element with a flat construction is fitted.

FIG. 12 illustrates by way of example how a baffle 80 can be fitted with a heating element 81, shown here schematically, in order to ensure that the surface tension at the average temperature of the material components flowing through does not form an obstacle to the continuous separation. E.g., coagulation of the material components could occur at an excessively low temperature and an accumulation of any such coagulated particles could impede the passage and consequently the cleaning process.

It does not matter whether the heating element is integrated in or on the baffle 80, like, for example, the sheet-shaped heating element shown in FIG. 12, or whether a hollow baffle for the installation of a heating element is used. In the case of a fixed baffle, a connection for an electric element or a steam-heated element can be provided for through the tank's side wall 82. A heating element's position and construction and/or its regulation are entirely dependent on the desired effect of the heating element.

Figure 13:
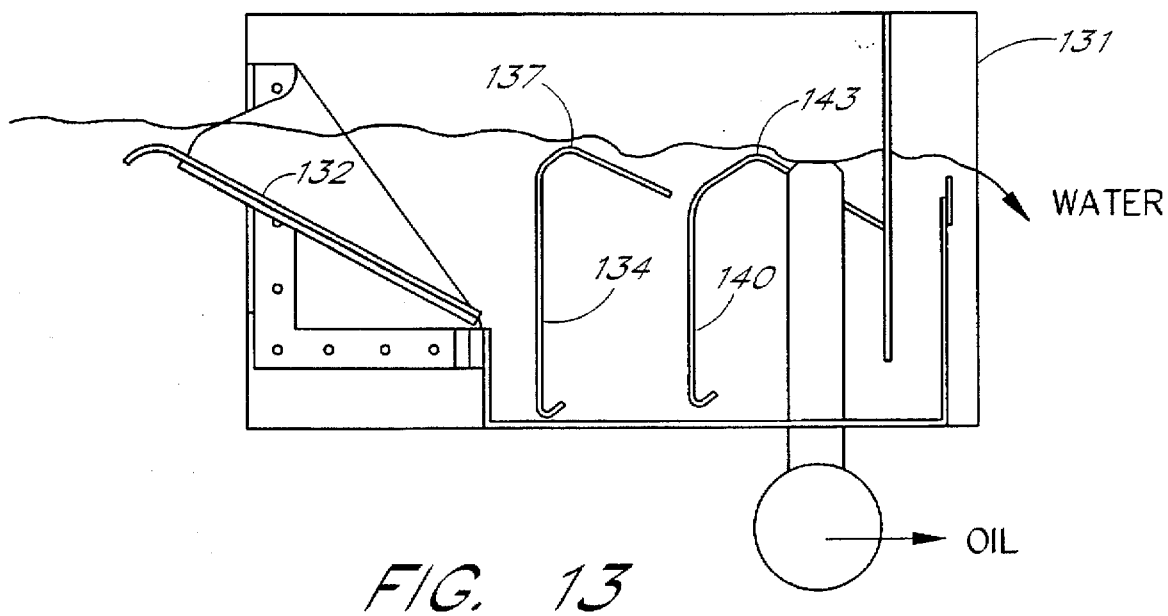
FIG. 13 is a schematic diagram of a similar device as shown in FIG. 6 in which there is another arrangement of the fixed baffles and the float adjusted valve-baffle. The water level is here shown in its lowest position.
Figure 14:
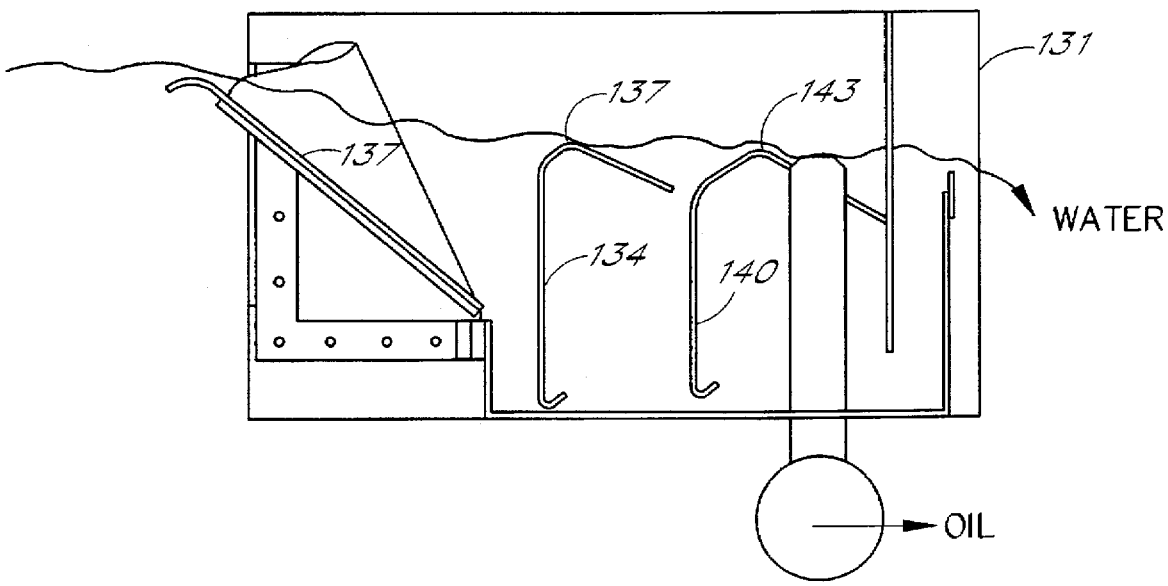
FIG. 14 shows a schematic diagram of the device of FIG. 13 wherein the water level is shown at its highest level.

FIGS. 13 and 14 both illustrate another upstream arrangement of a float adjusted valve 132 in a tank 131, whereas in a downstream direction a first fixed baffle 134 is positioned behind the float adjusted valve 132, and a second fixed baffle 140 is positioned further in a downstream direction. Both FIGS. 13 and 14 clearly show that the top section 137 of baffle 134 and the top section 143 of baffle 140 differ slightly in a horizontal plane, thereby enabling collection of the floating material from its supporting water layer. The float adjusted valve 132 is operated, e.g., in a way as described for the device of FIG. 6, and this makes the device suitable for fluctuating the water/oil levels or the like.

I claim:

1. A method for the separation of a floating layer of a lighter liquid from a heavier liquid supporting layer, comprising the steps of:

causing a mixture of the lighter and heavier liquids to flow into a separating device formed by a channel-shaped tank with side walls and a bottom wall;

obstructing the flow of the mixture in the tank with a baffle having a top end spaced from the top surface of the mixture so as to induce a laminar flow of primarily lighter liquid over the baffle into a collection chamber;

providing at least one opening for flow of the lower heavier layer past the baffle proximate the bottom wall of the tank and into the collection chamber, the opening inducing turbulent flow downstream from the baffle;

maintaining an interface between an upper laminar flow and a lower turbulent flow in the collection chamber below a separation layer between the lighter and heavier liquids;

removing the lighter liquid from a point above the separation layer; and discharging the heavier liquid from the tank over a transfer wall positioned below the height of the baffle.

2. The method of claim 1, wherein said step of obstructing includes obstructing the flow of mixture, in the tank with at least two baffles, an upstream baffle being spaced higher than a downstream baffle so as to induce a cascade-like laminar flow of primarily lighter liquid over the baffles into said collection chamber.

3. The method of claim 1, further comprising the step of mixing light plastic-foam balls in said lighter liquid to enhance a separation efficiency of said separating device.

4. The method of claim 1, further including the steps of:
   adjusting the height of said baffle top end; and
   adjusting the size of said opening.

5. The method of claim 1, wherein said step of maintaining is enhanced by the step of positioning a perforated sheet horizontally in the region of said separation layer, the perforated sheet including a plurality of perforations some of which have a size which increases in a downstream flow direction.

6. The method of claim 1, further comprising the step of:
   inducing a venturi effect in the flow of the lower heavier layer past the baffle by spacing a bottom edge of the baffle from the bottom wall of the tank to form said opening and curving the bottom edge of the baffle upward in a downstream flow direction.

7. The method of claim 1, further comprising the steps of:
   metering the flow of lighter liquid over said baffle into said collection chamber with a movable valve unit positioned at the baffle top end;
   metering the discharge of the heavier liquid over said transfer wall with a second movable valve unit positioned at an upper end of said transfer wall.

8. The method of claim 7, further comprising the step of coupling the movement of the first and second valve units to coordinate the flow of lighter liquid into the collection chamber and discharge of heavier liquid from said device.

9. The method of claim 8, further comprising the step of adjusting the relative positions of the first and second valve units.

10. The method of claim 7, further comprising the step of:
    controlling the movement of the first and second valve units in tandem with a float fixedly attached to an adjusting rod mounted to couple the movement of the first and second valve units, the elevation of the float being determined by a level of water downstream of the transfer wall.

11. The method of claim 1, further comprising the step of heating said baffle.

12. The method of claim 1, further comprising the step of:
    removing undesired larger particles accumulated upstream of said first valve unit using a slowly rotating scraper unit mounted on said device.

13. A device for separation of a floating layer of a lighter liquid from a heavier liquid supporting layer, comprising:

channel-shaped tank with side walls and a bottom wall, and an inlet at one end for supplying a mixture of lighter and heavier liquids at a first elevation;

a baffle positioned downstream of said inlet in the flow of said mixture in said tank and having a portion perpendicular to a downstream flow direction, the baffle having a top end positioned below said first elevation providing means to induce a laminar flow of primarily lighter liquid over the top of the baffle into a collection chamber provided in said tank, said baffle extending from said top end substantially the entire height of the tank to a bottom end proximate said bottom wall, said bottom end defining an opening providing means to induce turbulent flow of said heavier liquid into said collection chamber to join with said lighter liquid at a separation layer, said baffle inducing said laminar and turbulent flows in said collection chamber with an interface therebetween located below the separation layer between said lighter and heavier liquids;

an outlet through which said lighter layer is removed from said collection chamber; and a transfer wall forming a downstream wall of said tank, a top end of said transfer wall being positioned below said first elevation to allow said heavier liquid to discharge from said tank.

14. The device of claim 13, further comprising:
    a second baffle positioned upstream of said first baffle, the second baffle having a top end positioned at a height between said first elevation and the top end of the first baffle to create a cascading laminar flow of said lighter liquid over said first and second baffles into said collection chamber.

15. The device of claim 13, wherein said opening is defined by a gap formed between the bottom end of said baffle and said bottom wall, the gap extending substantially between the side walls of said tank.

16. The device of claim 13, wherein said baffle contacts said bottom wall, and said openings are formed by at least two apertures formed in said baffle proximate said bottom wall.

17. The device of claim 13, further comprising:
    a rigid sheet attached to said tank and positioned approximately at said separation layer between the lighter and heavier flows in said collection chamber, said sheet provided with a plurality of perforations and adapted to enhance a laminar flow above and below the separation layer.

18. The device of claim 13, wherein said baffle to end is curved downward in an upstream direction.

19. The device of claim 18, wherein said baffle further comprises an upwardly sloped portion in an upstream direction between said curved top end and said perpendicular portion.

20. The device of claim 18, wherein said baffle to end is curved downward in a downstream direction.

21. The device of claim 18, wherein said baffle bottom end is spaced above said bottom wall of said tank to form said opening, said bottom end being curved upward in a downstream direction.

22. The device of claim 13, further comprising:
a first movable valve unit mounted on said baffle top end for metering the amount of lighter liquid separated from said mixture and flowing into said collection chamber.

23. The device of claim 22, further comprising:
a second movable valve unit mounted on the top of said transfer wall for metering the amount of heavier liquid discharged from said tank.

24. The device of claim 22, wherein said first movable valve unit and said second movable valve unit are attached to said tank at hinged joints.

25. The device of claim 24, wherein said hinged joints are formed by flexible strips of elastomeric material.

26. The device of claim 24, further comprising a coupling unit attached to said first and second movable valve units for coupling the movement of said valve units.

27. The device of claim 26, wherein said coupling unit comprises an adjustment rod attached to a pair of lever arms each coupled to pivot respectively with said first and second movable valve units, said lever arms being adjustable with respect to said adjustment rod to adjust the pivot angle of the first and second valve units with respect to one another.

28. The device of claim 24, further comprising a pair of lever arms coupled respectively to the movement of the first and second movable valve units, said lever arms being commonly joined to a float positioned downstream of said transfer wall, the elevation of the float being determined by the amount of heavier liquid flowing over the transfer wall and adjusting the first and second removable valve units accordingly.

29. The device of claim 13, further comprising a heating element provided in said baffle.

30. The device of claim 13, further comprising a rotating scraper unit positioned upstream of said collection unit to remove accumulated larger particles from said upper layer of lighter liquid.

31. The device of claim 13, further including an adjustable valve positioned upstream of said baffle at a height between said first elevation and the top end of the baffle to meter the amount of upper lighter liquid flowing over said valve unit to said baffle.

32. The device of claim 13, wherein said outlet is defined by a standpipe.

33. The device of claim 13, wherein said outlet is defined by a pipe subject to an external suction.

* * * * *